(12) United States Patent
Manthey et al.

(10) Patent No.: US 8,343,559 B1
(45) Date of Patent: Jan. 1, 2013

(54) FURANOCOUMARIN REMOVAL FROM GRAPEFRUIT JUICE BY EDIBLE FUNGAL HYPHAE

(75) Inventors: John A. Manthey, Auburndale, FL (US); Kyung Myung, Winter Haven, FL (US); Jan A. Narciso, Winter Haven, FL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 252 days.

(21) Appl. No.: 12/338,221

(22) Filed: Dec. 18, 2008

(51) Int. Cl.
*A23L 2/02* (2006.01)
*A23L 2/04* (2006.01)

(52) U.S. Cl. ............ 426/51; 426/52; 426/61; 426/62; 426/599

(58) Field of Classification Search .......... 426/51
See application file for complete search history.

(56) References Cited

U.S. PATENT DOCUMENTS 1,406,554 A * 2/1922 Gusmer .................. 426/51

OTHER PUBLICATIONS

Weaver, et al., Increasing Potentencies of Enzymes Produced by *Aspergillus niger*, Mycologia, 1951.*
Teng, Biotransformation of Imperatorin by *Aspergillus flavus*, J. Nat. Prod. 2004, 67, 1014-1017.*
Castro et al., Variation of Flavonoids and Furanocoumarins in Grapefruit Juices: A Potential Source of Variability in Grapefruit Juice—Drug Interaction Studies, J. Agric. Food Chem., 2006.*

* cited by examiner

*Primary Examiner* — Lien T. Tran
*Assistant Examiner* — Philip Dubois
(74) *Attorney, Agent, or Firm* — John Fado; Robert D. Jones; Lesley Shaw (57) ABSTRACT

A method for removing furanocoumarins from a liquid includes the steps of incubating the liquid with fungal hyphae for at least about two hours and removing the hyphae from the liquid by a filtration step. The furanocoumarins can be recovered from the hyphae using methods within the ordinary skill in the art. The method is useful for the removal of furanocoumarins from furanocoumarin-containing citrus juice so that the juice can be safely consumed by humans taking drugs that are metabolized by P450 CYP3A, which is the enzyme responsible for the metabolism of many widely-prescribed medications.

3 Claims, 6 Drawing Sheets

FURANOCOUMARIN REMOVAL FROM GRAPEFRUIT JUICE BY EDIBLE FUNGAL HYPHAE

BACKGROUND OF THE INVENTION

1. Field of the Invention

This invention relates to a method for at least reducing the amount of furanocoumarins in grapefruit juice using edible fungal hyphae and to products produced by the method for at least reducing the amount of furanocoumarins in grapefruit juice.

2. Description of the Related Art

Furanocoumarins are a class of phenolic compounds produced by the Apiaceae and Rutacea families and have been extensively studied for their biological activities and clinical applications. The furanocoumarins are known to play roles in intestinal P450 enzyme inhibition, DNA photocrosslinking, and defense mechanisms as natural toxic compounds (Afek et al., Phytochemistry 50:1129-1132, 1999; Guo et al., Drug Metab. Dispos. 28:766-771, 2000; Oliva et al., J. Agric. Food Chem. 51:890-896, 2003; Santana et al., Curr. Med. Chem. 11:3239-3261, 2004; Weimin et al., Proc. Natl. Acad. Sci. USA 100:14593-14598, 2003). Grapefruit juice contains three major furanocoumarins, including bergamottin, 6',7'-dihydroxybergamottin, and 6',7'-epoxybergamottin, as well as numerous minor-occurring furanocoumarins including dimmers and hetero-dimers of bergamottin, 6',7'-epoxybergamottin, and 6',7'-dihydroxybergamottin (Manthey et al., J. Agric. Food Chem. 53:5158-5163, 2005; Manthey et al., Proc. Fla. State Hortic. Soc. 119:361-366, 2006). These furanocoumarins are known to be involved in the "grapefruit-drug interactions", in which they act as inhibitors of intestinal P450 CYP3A, the enzyme responsible for the metabolism of many widely-prescribed medications. In certain cases, this inhibition would cause a significant reduction in the first pass metabolism of certain drugs and this strongly modulates oral bioavailability. (Guo et al., Drug Metab. Dispos. 28:766-771, 2000; Wangensteen et al., Eur. J. Clin. Pharmacol. 58:663-668, 2003; Maskalyk, Can. Med. Assoc. J. 168:279-280, 2002). First pass metabolism refers to the metabolism of drugs before it is available for uptake into the body, while oral bioavailability is the amount of drug delivered to the subject's blood stream. The grapefruit-drug interaction basically causes too much of the drug being absorbed to the body. Despite the fact that grapefruit juice inhibits only enteric CYP3A4, a number of drugs with potential clinical importance are known to interact with grapefruit juice. For some drugs such as clyclosporine, simvastatin, and lovastatin, warnings or precautionary statements regarding the potential for a grapefruit juice interaction has been included in the product labeling. Cyclosporine and other drugs with a narrow therapeutic index are of particular concern because the extent of an interaction with grapefruit juice is unpredictable. This is due in part to interindividual variation in baseline enteric CYP3A4 content or activity and to variable concentrations of the active inhibitors in the different brands and preparations of grapefruit juice.

Microorganisms have been widely applied to the detoxification or elimination of certain classes of compounds via metabolism or biosorption (Bejaoui et al., J. Appl. Microbiol. 97:1038-1044, 2004; Bejaoui et al., J. Agric. Food Chem. 53:8224-8229, 2005; Denizli et al., Bioresour. Technol. 96:59-62, 2005; El-Nezami et al., Appl. Environ. Microbiol. 68:3545-3549, 2002; Farooq and Tahara, Curr. Top. Phytochem. 2:1-33, 1999). For example, adsorption of ochratoxin A, zearalenone, α-zearalenol, and chlorophenols from solutions by autoclaved fungi has been reported. Thus, similar removal of furanocoumarins from grapefruit juice by fungi may also be a practical method to reduce the grapefruit-drug interactions in humans.

These interactions have adversely affected the grapefruit industry, and have led to a need to develop a process to remove furanocoumarins from grapefruit juice in a manner that retains much of the original juice sensory attributes. Currently, there is no satisfactory means of producing a furanocoumarin-free citrus juice. Recently, in order to reduce the risk of citrus juice-drug interaction, there have been attempts to eliminate furanocoumarins from juice using chemical and physical methods (Paine et al., Am. J. Clin. Nutr. 83:1097-1105, 2006; Uesawa and Mohri, Biol. Pharm. Bull. 29:1286-1289, 2006a, Uesawa and Mohri, Biol. Pharm. Bull. 29:2274-2278, 2006b). The chemical method, developed by Paine et al. (2006), would be complicated and expensive, while UV and heat treatments, used by Uesawa and Mohri (2006a and 2006b), may produce unknown artifacts.

Although there have been attempts to remove furanocoumarins from grapefruit juice, there still remains a need in the art for a more effective removal method for citrus juice furanocoumarins. Therefore, the present invention, different from prior art systems, provides a method for quantitative, inexpensive removal of the furanocoumarins with only minimal effects to the juice quality and taste.

SUMMARY OF THE INVENTION

It is therefore an object of the present invention is to provide a method for at least reducing levels of at least one furanocoumarin in a liquid, by treating the liquid with an amount of fungal hyphae effective to at least reduce the level of at least one furanocoumarin.

Another object of the present invention is to provide a method for at least reducing the levels of at least one type of furanocoumarin in a citrus juice by treating the juice with an amount of fungal hyphae effective to at least reduce the level of at least one furanocomarin to levels that at least reduce the citrus juice-drug interaction.

A still further object of the present invention is to provide a method for at least reducing the levels of at least one furanocoumarin from grapefruit juice by treating the grapefruit juice with an amount of fungal hyphae effective to at least reduce the level of at least one furanocomarin to levels that at least reduce the grapefruit-drug interaction wherein the grapefruit juice retains its taste and nutritional value.

Another object of the present invention is to provide a method for at least reducing the levels of at least one furanocoumarin from a liquid by treating the liquid with an amount of fungal hyphae effective to at least reduce the level of at least one furanocomarin wherein said fungal hyphae is from *Aspergillus niger*.

Another object of the present invention is to provide a method for at least reducing the levels of at least one furanocoumarin from a liquid by treating the liquid with an amount of fungal hyphae effective to at least reduce the level of at least one furanocomarin wherein said fungal hyphae is from *Morchella ecsulenta*.

Another object of the present invention is to provide a method for at least reducing the levels of at least one furanocoumarin from a liquid by treating the liquid with an amount of fungal hyphae effective to at least reduce the level of at least one furanocomarin wherein said fungal hyphae is from the yeast *Saccharomyces cerevisiae*.

Another object of the present invention is to provide a method for at least reducing levels of at least one furanocoumarin in a liquid, by treating the liquid with an amount of fungal hyphae effective to at least reduce the level of at least one furanocoumarin wherein the fungal hyphae have been heat-killed.

A still further object of the present invention is to provide a citrus juice with a reduced citrus juice-drug interaction prepared by a method for at least reducing levels of at least one furanocoumarin wherein a commercial grade citrus juice is incubated at least one time with an amount of fungal hyphae effective to at least reduce the level of at least one furanocoumarin to levels that at least reduce the citrus juice-drug interaction wherein the juice containing the fungal hyphae is filtered to remove the hyphae.

A still further object of the present invention is to provide a citrus juice with a reduced citrus juice-drug interaction prepared by a method for at least reducing levels of at least one furanocoumarin wherein a commercial grade citrus juice is incubated with an amount of fungal hyphae effective to at least reduce the level of at least one furanocomarin to levels that at least reduce the citrus juice-drug interaction wherein the juice containing the fungal hyphae is filtered to remove the hyphae; and the juice filtrate is again treated with an amount of fungal hyphae effective to at further reduce the level of at least one furanocomarin to levels that at least reduce the citrus juice-drug interaction, followed again by a filtration step to remove the fungal hyphae from the citrus juice.

Further objects and advantages of the invention will become apparent from the following description.

BRIEF DESCRIPTION OF THE DRAWINGS

FIGS. 4 A and 4 B (as described in Example 7) is a graph showing profiles of flavor compounds in grapefruit juice. Control grapefruit juice (A) was compared to dead *Aspergillus niger*-treated grapefruit juice (B). Further identification of individual peaks corresponding to flavor compounds was not necessary as profiles of the peaks detected in control and treated grapefruit juices were identical.

FIGS. 5A-D (as described in Example 8) is a graph showing profiles of furanocoumarins in grapefruit juice. Grapefruit juices were incubated with or without dead *Morchella esculenta* (5A. without dead *M. esculenta*, 5B. 1.5 g of dead *M. esculenta*, 4C. 3.0 g of dead *M. esculenta*, and 4D. 9.0 g of dead *M. esculenta*). The peak number (1-11) and its corresponding compound are 1, unknown furanocoumarin-1; 2, unknown furanocoumarin-2; 3,6',7'-dihydroxybergamottin; 4,6',7'-epoxybergamottin; 5, 726 dimer-1; 6, 726 dimer-2; 7, bergamottin; 8, 708 dimer-1; 9, 708 dimer-2; 10, 708 dimer-3; 11, 708 dimer-4.

DETAILED DESCRIPTION OF THE INVENTION

The U.S. consumption of grapefruit juice per capita has declined by more than fifty percent following the reports of the potentially dangerous interactions between the furanocoumarins in some citrus juice such as grapefruit juice and certain widely-prescribed medications. Currently, there is no satisfactory means of producing a furanocoumarin-free citrus juice. Several methods are under development, including membrane filtration, pulp removal, ultraviolet light, and heat, but all of these proposed methods would be complicated or ineffective. The advantage of the invention is the inexpensive removal of the furanocoumarins, with only minimal effects to the juice quality and taste. This provides an enormous advantage over the other related art methods. For purposes of this invention, nutritional value shall be defined as vitamins, for example citric acid. For purposes of this invention quality and taste shall be defined as levels of sugar as well as flavanones and flavanoids for example, ferulic acid, narirutin, naringin, neohesperidin, and poncirin.

In accordance with the foregoing objects, the present invention is a method for removing furanocourmarins from a liquid using fungal hyphae. Preferred fungal hyphae include hyphae from *Aspergillus niger, Morchella esculenta*, and *Saccharomyces cerevisiae*. The process of the invention includes treating a liquid, preferably a furanocoumarin-containing liquid such as for example a furanocoumarin-containing citrus-based composition with a fungus composition using a furanocoumarin-reducing amount of the fungus composition.

The fungus can be a living or a dead fungus. The liquid and fungus composition are incubated for at least about two hours at about room temperature. The liquid can be further treated with an additional furanocoumarin-reducing amount of the fungus composition and incubated at room temperature for at least about another 2 hours. These steps can be repeated as necessary to produce a liquid that has at least reduced levels of furanocoumarins that is safe for consumption in the presence of drugs that are metabolized by P450 CYP 3A, the enzyme responsible for the metabolism of many widely-prescribed medications. After incubation, the liquid containing the fungus composition is filtered using methods well known by one of ordinary skill in the art.

Citrus-based compositions of the invention contain a juice, a juice concentrate, and may be provided by any combination of these forms and may be derived from more than one citrus fruit. Useful citrus fruits herein include grapefruit, lemon, lime and, preferably, any citrus fruit naturally containing an invention first-pass effect inhibiting compound or mixture of such compounds. Prior work in the field indicates that a common type of orange (*Citrus sinensis*) does not inhibit the first-pass effect. Citrus fruits that contain one or more substances that inhibit the first-pass effect are included in the invention, including all cross breeds, etc. and are referred to herein as "first-pass citrus". A preferred citrus fruit useful in the present invention is grapefruit.

The foregoing method for removing furanocoumarins can also be used to purify furanocoumarins from liquids. Furanocoumarins are released from the fungal hyphae using methods well known in the art.

The following examples are intended only to further illustrate the invention and are not intended to limit the scope of the invention as defined by the claims. Grapefruit juice is used as a model for removal of furanocoumarins from a liquid. One of ordinary skill in the art could readily substitute any furanocoumarin-containing liquid in the described method without undue experimentation. Student t-test was used to compare the differences in changes between controls and treatments under various conditions. Two-tailed P values were calculated to report significant differences in the mean values. All experiments in the studies were conducted with three replicates.

Example 1

A culture of *Aspergillus niger* van Tieghem was obtained from the ARS Culture Collection at the national Center for Agricultural utilization Research in Peoria, Ill. (NRRL No. 326). The fungus was grown on potato dextrose agar (BD/Difco, Sparks, Md.) plates for about 5 to 7 days at approximately 25 degrees centigrade. Spores were removed from the plate surface using sterile water containing about 0.1% Tween 20 and gently rubbing with a sterile disposable transfer needle (Fisher Scientific, Pittsburgh, Pa.). The resulting liquid was filtered through 3 layers of cheesecloth, and the filtrate was collected as a spore suspension and adjusted for inoculum concentration using a haemocytometer (Hausser Scientific, Horsham, Pa.).

Example 2

Grapefruit juice samples were prepared by squeezing pink grapefruit obtained from a local store, followed by a pH adjustment to 5.0. The grapefruit juice was stored at $-20°$ C. for future use. Fifty or one hundred mL grapefruit juice in 250 mL flasks was placed in a circulating water bath, heated to $90°$ C. until the internal temperature of grapefruit juice reached $71°$ C. The grapefruit juice samples were held at this temperature for 15 sec, removed, chilled and brought to ambient temperature ($25°$ C.).

To culture *A. niger* in grapefruit juice, a 1 mL of spore suspension ($10^6$ spores/mL) was inoculated into a 100 mL grapefruit juice, and incubated for 4 days at 120 rpm, $25°$ C. After incubation for 4 days, the grapefruit juice samples were filtered through Miracloth, and the resulting filtrate and mycelial tissue on Miracloth were collected and subjected to ethyl acetate extraction.

To determine compounds in grapefruit juice filtrates from grapefruit juice incubated with *A. niger* were extracted with ethyl acetate (~100 mL) three times. Live or dead fungal material collected on Miracloth was placed in 100 mL ethyl acetate for 1 h, shaken with added water (~100 mL), and extracted with additional volume of ethyl acetate. The extracts from grapefruit juice filtrate and fungus were dried using a rotary evaporator, the resulting pellets were dissolved in 1-15 mL acetone, and 20-40 µL aliquots were injected on a 4.6×150 mm 5µ Eclipse XDB-C8 column (Agilent Technologies, Palo Alto, Calif.), using an Agilent 1100 quaternary pump system equipped with a Hewlett Packard 1050 photodiode array detector. Samples were eluted using a gradient of water:aceonitrile:0.05% formic acid, which was started at 85:10:5, increased to 75:20:5 in 15 min, to 70:25:5 in 20 min, to 55:40:5 in 30 min, to 25:70:5 in 55 min, and to 0:95:5 in 67 min, and was held isocratically for 13 min. The flow rate was 0.75 mL/min. Chromatograms were recorded at 320 nm and data were analyzed using Chemstation revision 09.01. (Agilent Technologies).

For identification of compounds in samples, individual chromatographic peaks were compared with authentic standard compounds and characterized by UB property and electrospray mass spectrometry (ESI-MS) as previously described (Manthey et al., J. Agric. Food Chem. 53:5158-5163, 2005; Manthey et al., Proc. Fla. State Hortic. Soc. 119:361-366, 2006. Authentic samples of bergamottin, 6',7'-dihydroxybergamottin, 6',7'-epoxybergamottin, and 7-geranyloxycoumarin were obtained as described by previous study (Tatum et al., Phytochemistry 18:500-502, 1979) and ferulic acid, narirutin, naringin, neohesperidin, and poncirin were gifts by James H. Tatum (USDA Citrus and Subtropical Products Laboratory, Winter Haven, Fla.). The 726 and 708 dimers were determined by comparing MS fragmentation data to compounds identified previously (Guo et al., Drug Metab. Dispos. 28:766-771, 2000; Widmer et al., J. Food Sci. 70:C307-C312, 2005), while unknown furanocoumarin-like compounds were determined by a characteristic furanocoumarin UV peak at 320 nm. These compounds were quantified depending on a conversion factor of bergamottin.

Figure 1:
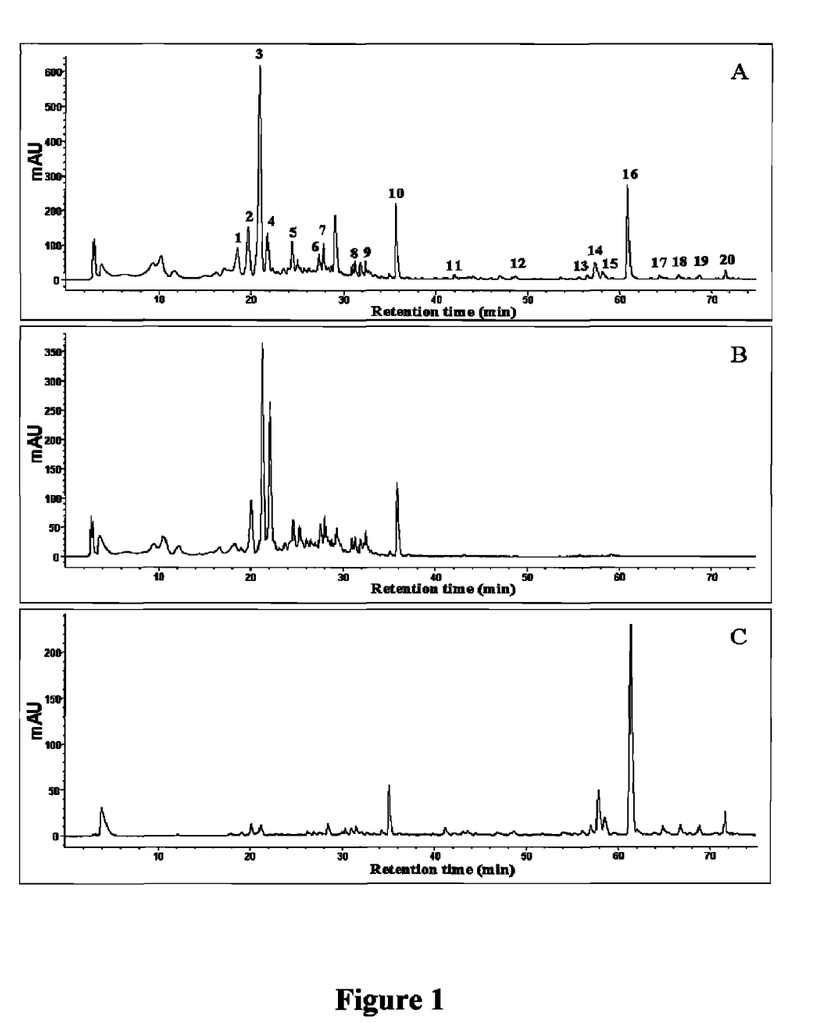
FIGS. 1A-C (as described in Example 2) is a graph showing the HPLC profiles of furanocoumarins in grapefruit juice at 4 days after incubation in the absence or presence of *Aspergillus niger*. Furanocoumarin peaks were identified by photodiode array detection at 320 nm from ethyl acetate extraction of grapefruit juice control without *A. niger* shaken for 4 days at 120 rpm, 25° C. (A) and ethyl acetate extractions of grapefruit juice culture filtrate (B) and mycelial tissue (C) at 4 days after incubation with *A. niger*. The peak number (1-20) and its corresponding compound are 1, ferulic acid conjugate; 2, narirutin; 3, naringin; 4, neohesperidin; 5, furanocoumarin unknown-1 (FCU-1); 6, FCU-2; 7, poncirin; 8, FCU-3; 9, FCU-4; 10, 6',7'-dihydroxybergamottin; 11, FCU-5; 12, 6',7'-epoxybergamottin; 13, 726 dimer-1; 14, 726 dimer-2; 15, 7-geranyloxycoumarin; 16, bergamottin; 17, 708 dimer-1; 18, 708 dimer-2; 19, 708 dimer-3; 20, 708 dimer-4.
Figure 2:
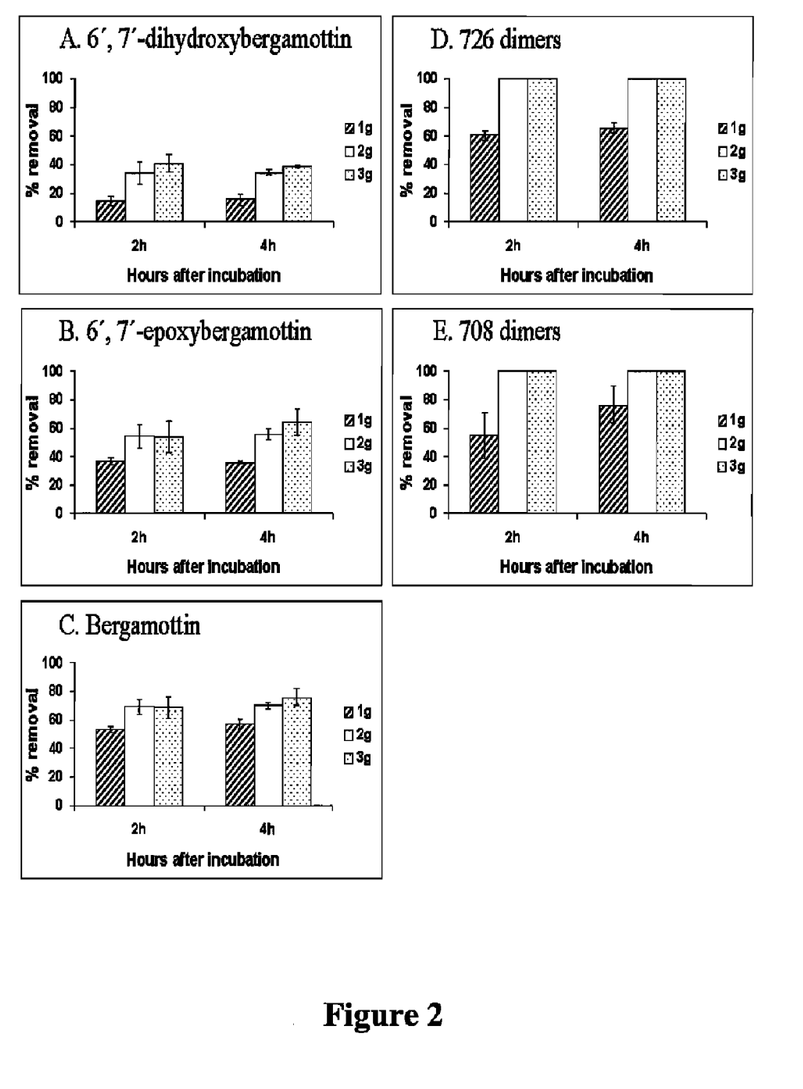
FIGS. 2A-E (as described in Example 4) is a graph showing dose-and-time-dependent removal of five major furanocoumarins in grapefruit juice by autoclaved *Aspergillus niger*. Different amounts (1, 2 and 3 g) of autoclaved *A. niger* were added to 50 mL grapefruit juice and incubated for 2 and 4 hrs. The autoclaved *A. niger* was filtered, and resulting grapefruit juice was extracted with ethyl acetate, and furanocoumarins were analyzed by HPLC. The % removal of furanocoumarins, 6',7'-dihydroxybergamottin (A), 6',7'-epoxybergamottin (B), bergamottin (C), 726 dimers (D), and 708 dimers (E) from grapefruit juice was calculated based on concentrations of those compounds in control grapefruit juice as 100%. The 726 and 708 dimers included two 726 and four 708 dimers shown in Table 1.

Twenty peaks corresponding to phenolic compounds in grapefruit juice were detected. The compounds included ferulic acid, 7-geranyloxycoumarin, 4 flavanones, and 14 furanocoumarins (see FIGS. 1A-1C). The 4 flavanones were narirutin, naringin, neohesperidin, and poncirin, and the 14 furanocoumarins were bergamottin, 6',7'-dihydroxybergamottin, 6',7'-epoxybergamottin, 726, and 708 dimers and unknown furanocoumarin-like derivatives. When grapefruit juice was incubated with *A. niger* for about 4 days after spore inoculation, polar compounds 1-10 eluted prior to about 40 minutes were detected from grapefruit juice culture filtrate. The nonpolar compounds which eluted after about 40 minutes were recovered from fungal tissue (FIG. 1). This result shows that fungal hyphae efficiently adsorbs nonpolar furanocoumarins, while adsorbion of polar flavanones and furanocoumarins by fungal hyphae did not occur.

Example 3

In experiments using autoclaved *A. niger*, 5 mL of spore suspension ($10^6$ spore/mL) was inoculated in an 2 L flask containing 1 L potato dextrose broth, and shaken on a large capacity orbital shaker at 275 rpm to avoid mycelial cohesion to the sides of the flask at 25° C. After one week, the flasks were autoclaved for 20 min at 121° C. to kill the fungus. The dead fungal material was vacuum-filtered from the broth and used as adsorbent. Approximately, 10 g fresh weight of the dead fungal material was collected from a flask. Grapefruit juices (100 mL) in 250 mL flasks were incubated with or without 2 g (fresh weight) of autoclaved *A. niger* for 4 days at 25° C.

Four flavanones were not adsorbed by dead fungus, while 7-geranyloxycoumarin and furanocoumarins, except furanocoumarin-like 1, 2, 3, and 4, were adsorbed by dead fungus (Table 1). Similar results of compound compositional changes in grapefruit juice, except ferulic acid, were achieved from experiments using live and dead fungus. In addition, it was observed that dead fungal mass washed with organic solvents such as acetone/ethyl acetate (1:1), chloroform/methanol (1:1) could not adsorb the furanocoumarins in grapefruit juice (data not shown), suggesting an involvement of lipophilic compounds in the interaction with furanocoumarins. Taken together, the results demonstrate that flavanones and some polar furanocoumarins did not interact with the fungus, while 7-geranyloxycoumarin and some non-polar furanocoumarins bound to fungal lipophilic materials, possibly cell membrane components.

This example shows that the use of 6',7'-dihydroxybergamottin and 6',7% epoxybergamottin by *A. niger* differs from that of ferulic acid, flavanones, and polar furanocoumarins which was discussed above (Table 1). Approximately 87% of 6', epoxybergamottin and 30% of 6',7'-dihydroxybergamottin in grapefruit juice were bound to dead *A. niger* (Table 1), indicating that both compounds are adsorbed to the fungal tissue.

In contrast to binding of 6',7'-dihydroxybergamottin and 6',7'-epoxybergamottin in grapefruit juice to *A. niger* tissue, binding of 7-geranyloxycoumarin, bergamottin, 726 and 708 dimers and furanocoumarin-like 5 to the fungal tissue was greatly significant (Table 1). Even though bergamottin is not completely adsorbed to fungal tissue, majority of bergamottin binds to fungal tissue. Thus, disappearance of bergamottin in grapefruit juice in the presence of *A. niger* represents the outcomes of binding. Considering that 7-geranyloxycoumarin, 726 and 708 dimers, and bergamottin are less polar than 6',7'-dihydroxybergamottin and 6',7'-epoxybergamottin and 6',7'-dihydroxybergamottin and 6',7'-epoxybergamottin are less polar than flavanones and polar furanocoumarins, it can be concluded that polarity is a critical factor determining the binding efficiency of the compounds to fungus. Previously, El-Nezami et al. (Appl. Environ. Microbiol. 68:3545-3549, 2002) demonstrated a binding rather than metabolism as an interaction mechanism of non-polar zearalenone and α-zearalenol with bacteria.

TABLE 1

Changes in concentrations of compounds in grapefruit juices in the absence (−) or presence (+) of autoclaved *Aspergillus niger* for 4 days.

| Compounds | Concentrations (ppm) − | Concentrations (ppm) + | t test[a] |
|---|---|---|---|
| Ferulic acid | 0.43 | 0.48 | ns |
| Narirutin | 8.47 | 9.16 | ns |
| Naringin | 45.62 | 47.36 | ns |
| Neohesperidin | 2.17 | 2.40 | ns |

TABLE 1-continued

Changes in concentrations of compounds in grapefruit juices in the absence (−) or presence (+) of autoclaved *Aspergillus niger* for 4 days.

| Compounds | Concentrations (ppm) − | Concentrations (ppm) + | t test[a] |
|---|---|---|---|
| Poncirin | 2.29 | 2.14 | ns |
| 7-geranyloxycoumarin | 0.33 | 0.13 | * |
| 6',7'-dihydroxybergamottin | 2.46 | 1.72 | * |
| 6',7'-epoxybergamottin | 0.57 | 0.05 | ** |
| Bergamottin | 1.75 | 0.39 | ** |
| 726 dimer 1 | 0.04 | <0.001[b] | ** |
| 726 dimer 2 | 0.36 | 0.05 | ** |
| 708 dimer 1 | 0.05 | <0.001 | ** |
| 708 dimer 2 | 0.09 | <0.001 | ** |
| 708 dimer 3 | 0.06 | <0.001 | ** |
| 708 dimer 4 | 0.13 | 0.02 | * |
| Furanocoumarin-like 1 | 0.22 | 0.22 | ns |
| Furanocoumarin-like 2 | 0.25 | 0.23 | ns |
| Furanocoumarin-like 3 | 0.54 | 0.52 | ns |
| Furanocoumarin-like 4 | 0.35 | 0.35 | ns |
| Furanocoumarin-like 5 | 0.36 | <0.001 | ** |

Means of compound concentrations in control and autoclaved mycelia-treated grapefruit juice were compared by Student t-test, and two-tailed probability (P) were calculated (ns = P > 0.05; * = P < 0.05; ** = P < 0.01).
[b]<0.001 indicates a level below detection limit.

Example 4

Dose- and time-dependent experiments were carried out to further investigate the binding capacity of 5 major furanocoumarins to dead fungal material, which showed a significant reduction as shown in Table 1, using three different amounts (1, 2, and 3 g) of dead fungus at two different incubation periods (2 and 4 hr). The dead fungal mass was cut into pieces, and various amounts (1, 2, and 3 g) of the dead fungal samples were placed into either 50 or 100 mL grapefruit juice, which was shaken at 200 rpm, 25° C. The grapefruit juice were harvested at 2, 4, 6, and 8 hr or 4 days after incubation, and five major furanocoumarins in the grapefruit juice were analyzed by HPLC as described in Example 1.

When added amount of dead fungal material into 50 mL grapefruit juice was increased from 1 to 2 g, significant amounts of all the 5 major furanocoumarins were removed form grapefruit juice (see FIGS. 2A-2E). However, removal of the 5 compounds by incubation with 3 g of dead fungal mass was not enhanced compared to 2 g of dead fungal mass (P>0.05). In addition, the removal of the compounds from grapefruit juice at 2 hr was similar to that at 4 hr, indicating that binding of the furanocoumarins to dead fungal mass occurred within 2 hr. The removal efficiency at 6 and 8 hr after incubation did not differ from that at 4 hr (data not shown). The removal of 726 and 708 dimers by dead fungal material was most effective, followed by bergamottin, 6',7'-epoxybergamottin, and 6',7'-dihydroxybergamottin, suggesting that compounds with lower polarity was more efficiently adsorbed to dead fungal material than compounds with higher polarity.

Example 5

For a recycle experiment, 50 mL GFJ, which was shaken with 3 g of the fungal sample for 4 hr as described in Example 3, was filtered through cheesecloth and shaken with additional 3 g of the fungal samples for 4 hr. After the incubation, GFJ was filtered through cheesecloth and subjected to ethyl acetate extraction.

Figure 3:
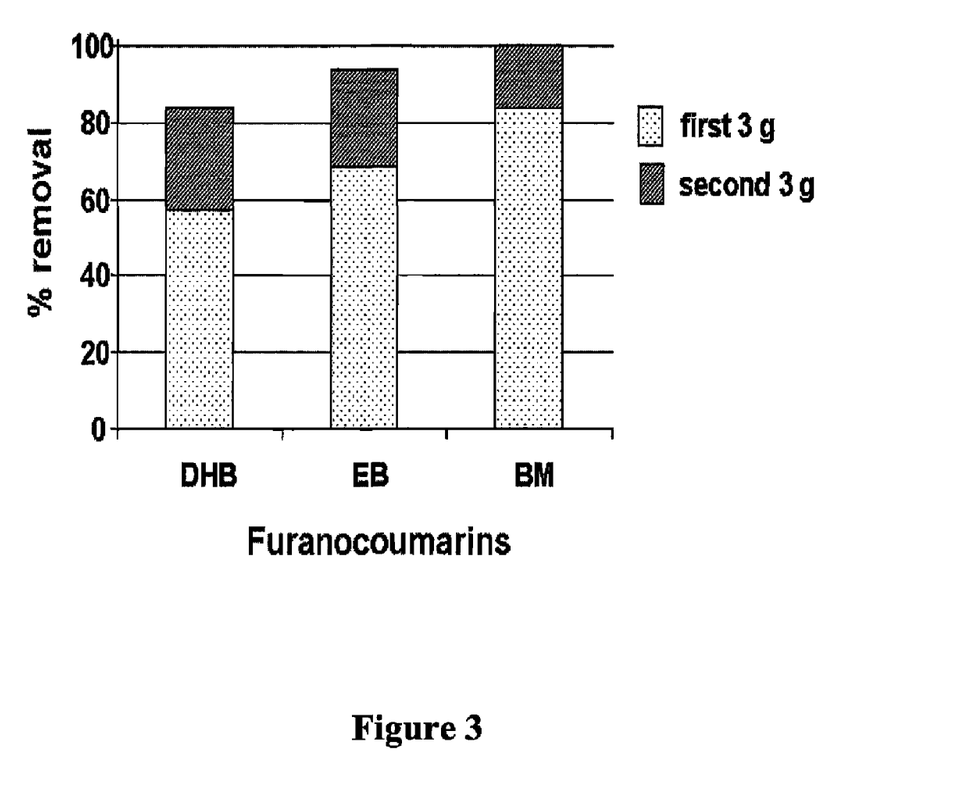
FIG. 3 (as described in Example 5) is a graph showing removal of three major furanocoumarins in grapefruit juice by autoclaved *Aspergillus niger*. Three gram of autoclaved *A. niger* was added to 50 mL grapefruit juice and incubated for 4 hr. The autoclaved *A. niger* was filtered, and 3 g of autoclaved *A. niger* was added to the grapefruit juice pre-treated with 3 g of autoclaved *A. niger* and incubated for 4 hr. The autoclaved *A. niger* was filtered, the resulting grapefruit juice was extracted with ethyl acetate, and the furanocoumarins were analyzed by HPLC. The % removal of furanocoumarins from grapefruit juice, 6',7'-dihydroxybergamottin (DHB), 6',7'-epoxybergamottin (EB), and bergamottin (BM) was calculated based on concentrations of those compounds in control grapefruit juice as 100%.

When 3 g of additional autoclaved fungal material was added to filtered GFJ, previously incubated with 3 g autoclaved fungal material for 4 hr, approximately 25%, 26%, and 16% of DHB, EB, and BM were additionally removed from the pre-incubated GFJ, respectively (see FIG. 3). In other words, compared to control GFJ, along with the complete removals of BM and 726 and 708 amu dimers, only 16% and 6% of DHB and EB remained in GFJ after the recycle of GFJ with first and second 3 g of autoclaved fungal materials. The results indicate that it is possible that the additional recycle of fungal material can completely remove DHB and EB in GFJ.

Example 6

To determine whether the removal of the furanocoumarins in grapefruit juice by autoclaved *A. niger* produces potential reductions in the grapefruit-drug interactions, in vitro CYP 3A4 activity inhibition by grapefruit juice incubated with autoclaved fungal material was compared to that by untreated grapefruit juice and orange juice. Fifty mL grapefruit juice in 250 mL flasks were incubated with different amounts (1, 2, and 3 g) of autoclaved *A. niger* for 4 hr at 25° C., and filtered through cheesecloth. The different amounts (2-40 µL) of the resulting grapefruit juice were subjected to CYP 3A4 enzyme inhibition assay using Vivid® CYP 3A4 screening kit (Invitrogen, Carlsbad, Calif.), according to manufacturer's instructions. The grapefruit juice was further extracted with ethyl acetate, dried, and dissolved in 1 mL acetone. The different dilutions (0.04-5 µL) of the resulting grapefruit juice extracts were also subjected to CYP 3A4 enzyme inhibition assay. $IC_{50}$ values were determined by concentrations of grapefruit juice and grapefruit juice extracts in 100 µL reaction volume which caused 50% inhibition of the enzyme activity. Orange juice used for comparison does not exhibit drug interactions (Mertens-Talcott et al., J. Clin. Pharmacol. 46:1390-1416, 2006).

The $IC_{50}$ values of grapefruit juice were increased as more amounts of autoclaved *A. niger* were added into the grapefruit juice (Table 2). Grapefruit juice incubated with 3 g autoclaved *A. niger* showed an approximately three-fold increase of $IC_{50}$ value (30.4 µL), compared to control grapefruit juice (11.5 µL) (P<0.05). As expected, the additional removal of 6',7'-dihydroxybergamottin and 6',7'-epoxybergamottin, and bergamottin in grapefruit juice by second 3 g of autoclaved fungal material (data not shown) resulted in a slight decrease in inhibition of the CYP 3A4 enzyme activity from 30.4 to 38.1 µL, compared to grapefruit juice treated with 3 g (Table 2). The $IC_{50}$ value (38.1 µL) of grapefruit juice treated with 6 g (3+3 g) of autoclaved fungal material was comparable to that of OJ (45.7 µL). The dependency of $IC_{50}$ value on the amounts of autoclaved fungal material was also observed when grapefruit juice extracts were used for CYP 3A4 inhibition assay (Table 2).

This example shows that a reduction of grapefruit juice furanocoumarins resulted in a reduction of CYP 3A4 inhibition. The finding suggests that production of grapefruit juice with reduced furanocoumarins can be achieved by using dead *A. niger*, minimizing grapefruit juice-drug interaction. Even though it seems that polar furanocoumarins (furanocoumarin-like 1-4) and residual 6',7'-dihydroxybergamottin, 6',7'-epoxybergamottin, and bergamottin, which remained in grapefruit juice, may contribute to the remaining CYP 3A4 inhibition, involvement of the polar furanocoumarins in CYP 3A4 inhibition is unknown. In addition, application of dead fungal material to remove other classes of non-grapefruit juice furanocoumarins with lower polarity might be possible. Therefore, our data suggest that dead *A. niger* would be a useful tool to adsorb non-polar furanocoumarins in grapefruit juice without altering profiles of other compounds, and subsequently reduce grapefruit juice-drug interaction.

TABLE 2

CYP 3A4 enzyme activity inhibition by grapefruit juice incubated with or without autoclaved *Aspergillus niger*.

| Amounts of autoclaved fungal mass used (g) | $IC_{50}$ values (µL sample/100 µL reaction volume) | | |
|---|---|---|---|
| | GFJ[b] | GFJ extracts[c] | OJ[d] |
| 0 (control) | 11.5 ± 3.1 | 0.30 ± 0.05 | 45.7 ± 3.5 |
| 1 | 21.0 ± 7.9 | 0.64 ± 0.09 | ND[e] |
| 2 | 26.4 ± 0.6 | 0.86 ± 0.10 | ND |
| 3 | 30.4 ± 3.1 | 0.99 ± 0.16 | ND |
| 3 + 3[a] | 38.1 ± 5.2 | 1.04 ± 0.21 | ND |

Grapefruit juices (GFJ, 50 mL in 250 mL flasks) were incubated with (1, 2, and 3 g) or without (0 g, control) autoclaved *A. niger* for 4 hr at 25° C.
[a]GFJ pre-treated with 3 g of autoclaved fungal material was incubated with additional 3 g of autoclaved fungal material.
[b]The resulting GFJ was subjected to CYP 3A4 enzyme inhibition assay.
[c]GFJ was extracted with ethyl acetate, dried, and dissolved in 1 mL acetone, and the resulting GFJ extracts were subjected to CYP 3A4 enzyme inhibition assay.
[d]Orange juice (OJ) was used as a negative control.
[e]ND = not determined. Data represent means ± standard deviations.

Example 7

Quality parameters of grapefruit juice incubated with autoclaved *A. niger* was tested using standard methods, and compared to non-treated grapefruit juice. For sugar/acid content, soluble solids were measured by refractometer and acidity and citric acid were measured by a titration. Cloudiness of grapefruit juice was evaluated by absorbance at 650 nm. In addition, concentration of a class of carotenoids in grapefruit juice were measured. Flavor compounds were also analyzed using GC-MS. suggesting autoclaved *A. niger* can be used for making a furanocoumarin-reduced grapefruit juice without altering other flavor compounds.

Figure 4:
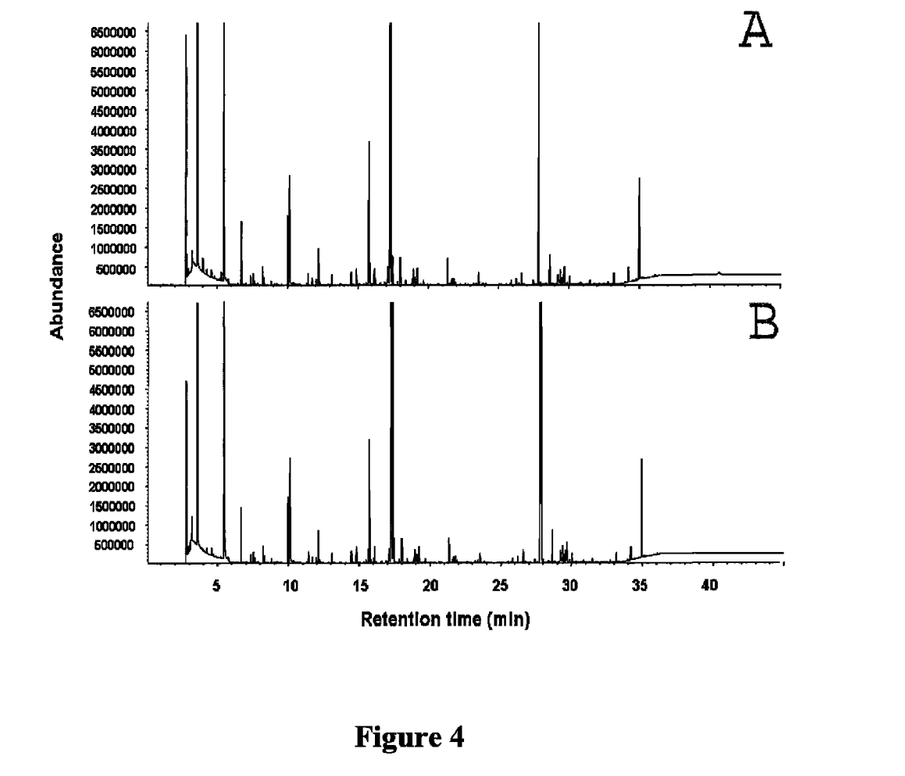
Figure 5:
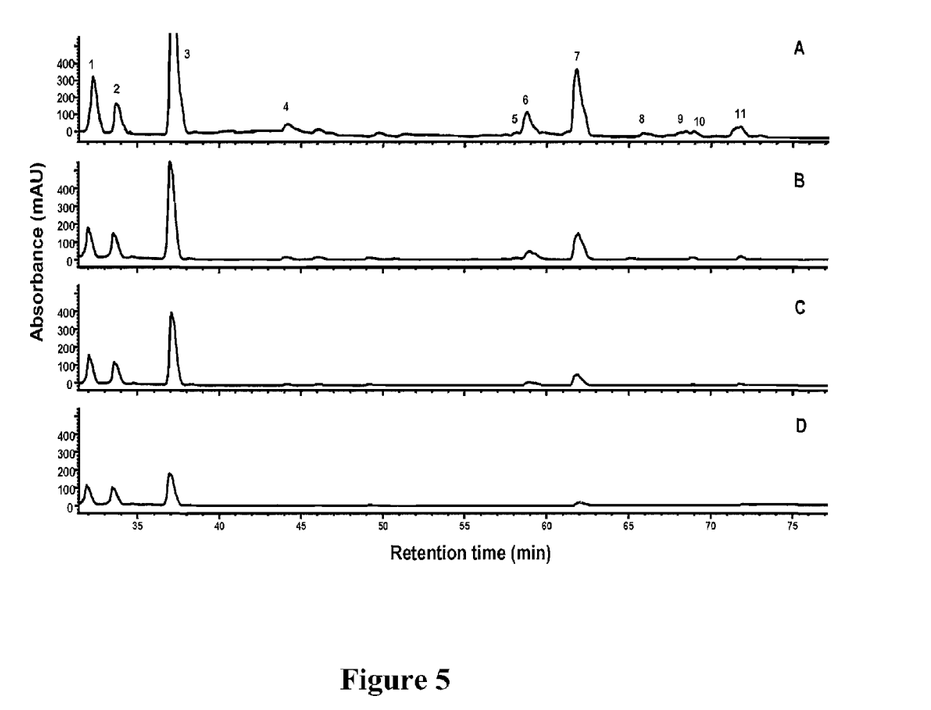

Sugar/acid contents were not affected by the presence of dead fungal material (Table 3). Dead *A. niger*-treated grapefruit juice was slightly cloudier than control grapefruit juice. Concentrations of each individual compounds within a class of carotenoids were lower in grapefruit juice treated with the dead fungal mass, suggesting an adsorption of these compounds to the fungal mass, possibly due to the nature of polarity of the compounds. Profile of flavor compounds in grapefruit juice was not affected by the presence of dead fungal material (see FIGS. 4A and 4B). Although these results indicate that some parameters can be affected by the treatment of autoclaved fungal material, the parameter can be easily adjusted after removal of furanocoumarins.

TABLE 3

Contents of sugar/acid and carotenoids of grapefruit juice treated with or without dead *Aspergillus niger*.

| | | Control grapefruit juice | Treated grapefruit juice |
|---|---|---|---|
| sugar/acid | sugar (° Bx) | 9.0 ± 0.0 | 8.6 ± 0.0 |
| | acidity (pH) | 3.38 ± 0.08 | 3.42 ± 0.01 |
| | citric acid (g/100 mL juice) | 0.85 ± 0.01 | 0.82 ± 0.02 |
| cloudiness | Absorbance at 650 nm | 0.89 ± 0.02 | 1.30 ± 0.03 |
| carotenoids (µg/g fruit) | xanthophyll | 0.16 ± 0.03 | 0.05 ± 0.03 |
| | zeaxanthin | 0.29 ± 0.03 | 0.09 ± 0.03 |
| | α-carotene | 0.15 ± 0.02 | 0.06 ± 0.02 |
| | β-carotene | 6.19 ± 0.59 | 2.69 ± 0.29 |
| | astaxanthin | 0.04 ± 0.02 | 0.01 ± 0.00 |
| | canthaxanthin | 0.13 ± 0.01 | 0.05 ± 0.00 |
| | lycopene | 28.79 ± 2.28 | 13.65 ± 1.51 |

Example 8

A culture of *Morchella esculenta* Dill. ex Pers. (#FP-140146) was obtained from the USDA Forest Service, Center for Forest Mycology Research in Madison, Wis. The culture was maintained on YM (yeast malt) agar at ~25° C. These cultures were used to provide initial inoculum by placing a few small sections of the culture into 100 mL flasks of YM broth. The inoculated 2 L flasks were placed on a large orbital shaker (100 rpm) and held at ~20-25° C. After approximately 2 weeks, the flasks containing the *Morchella* mycelium were autoclaved at 121° C. at 15 psi for 25 minutes to kill the organism. After cooling, the contents (broth+dead mycelium) of the flasks, each in turn, were placed into a 1 L Waring stainless steel blender cup and the tissue was macerated for 1-2 minutes, depending on the size of the mycelial mass. The resulting macerated tissue was vacuum-filtered using a Buchner funnel, fitted with a fiberglass screen to provide a foundation for the filter paper to prevent breakage, and a 9.0 cm coarse filter disc.

Grapefruit juice samples were prepared by squeezing pink grapefruit obtained from a local store, followed by a pH adjustment to 5.0. The macerated *Morchella* samples (1.5, 3, and 9 g) were added to the 100 mL grapefruit juice and incubated for 4 hr at 250 rpm, RT (20-25° C.). After incubation, the grapefruit juice samples were filtered and the collected grapefruit juice filtrates were subjected to ethyl acetate extraction (100 mL, three times) as described in Example 1.

A number of furanocoumarins in grapefruit juice were partially or fully adsorbed by dead fungal material, depending on the amount of dead fungal material added (FIGS. 5A-5D). These results are similar to the results obtained using autoclaved *A. niger*. Given that *M. esculenta* is an edible and safe fungus, our results make it possible to use *Morchella esculenta* for furanocoumarin removal from grapefruit juice.

Example 9

Figure 6:
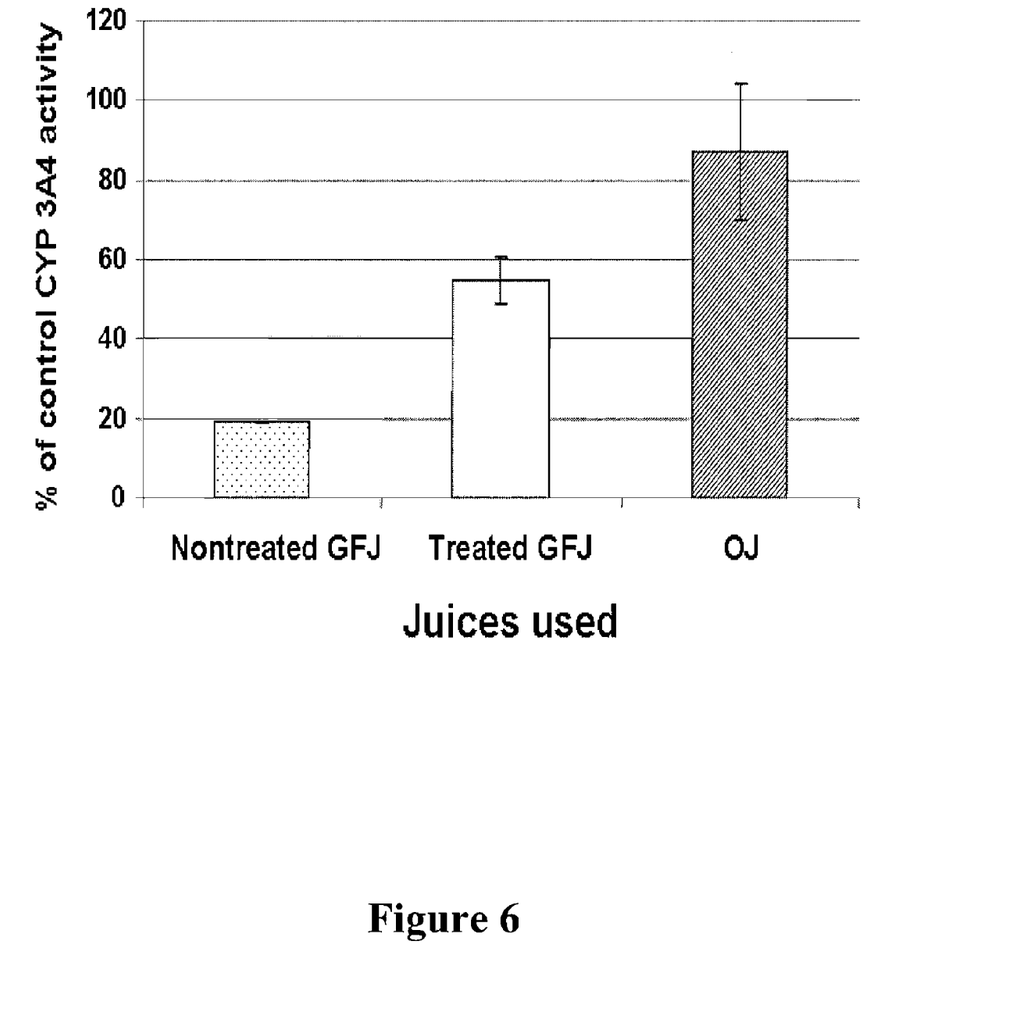
FIG. 6 (as described in Example 2) is a graph showing inhibition of CYP 3A4 activity by autoclaved *Morchella*-nontreated or -treated grapefruit juice (GFJ) and orange juice (OJ). 2.5 µL of grapefruit juice and orange juice was used for CYP 3A4 activity assay. For treated grapefruit juice, *Morchella* (7 g) was incubated with 50 mL grapefruit juice. The control activity (100% activity) using water was 1.086 nmole/min/nmole CYP 3A4. Bars represent standard deviations of means of triplicates.

Inhibition of CYP 3A4 activities by nontreated and *Morchella*-treated grapefruit juices was measured as described in Example 5. Inhibition of CYP 3A4 activity by 2.5 µL of autoclaved *Morchella*-nontreated or -treated grapefruit juices and orange juice. For treated GFJ, *Morchella* (7 g) was incubated with 50 mL GFJ. The control activity (100% activity) using water was 1.086 nmole/min/nmole CYP 3A4. Inhibition of the enzyme activity by treated grapefruit juice was decreased about 3-fold compared to nontreated grapefruit juice (see FIG. 6), due to removal of some nonpolar furanocoumarins in grapefruit juice by autoclaved fungal material as shown in FIGS. 5A-5D.

Example 10

To test whether other fungi have a similar binding capability to furanocoumarins, the yeast *Saccharomyces cerevisiae* was used. *S. cerevisiae* was grown in YM broth and harvested after 4 days. The cultures were autoclaved, centrifuged at 5,000 g for 5 min, and the resulting pellets were collected. The collected samples were air-dried and crushed using coffee grinder. Three g of the sample was mixed with grapefruit juice (50 mL) and shaken for 4 hr at 25° C. After incubation GFJ was filtered and nonpolar furanocoumarins in GFJ were extracted with ethyl acetate and analyzed using HPLC.

An unknown furanocoumarin (FCU-5), 726 dimers, and 708 dimers were completely removed from grapefruit juice, while 73%, 82%, and 91% of 6',7'-dihydroxybergamottin, 6',7'-epoxybergamottin, and bergamottin were removed from grapefruit juice, respectively (Table 4). These results demonstrate that *S. cerevisiae* effectively adsorbed furanocoumarins, even when the autoclaved fungal material is dried. Therefore, this example shows that removal of furanocoumarins in grapefruit juice using dried material of edible fungi can be achieved.

TABLE 4

Removal of nonpolar furanocoumarins in grapefruit juice by Yeast

| | Removal (%) |
|---|---|
| 6',7'-dihydroxybergamottin | 73 |
| FCU-5 | 100 |
| 6',7'-epoxybergamottin | 82 |
| 726 amu dimer-1 | 100 |
| 726 amu dimer-2 | 100 |
| bergamottin | 91 |
| 708 amu dimer-1 | 100 |
| 708 amu dimer-2 | 100 |
| 708 amu dimer-3 | 100 |
| 708 amu dimer-4 | 100 |

All of the references cited herein, including U.S. Patents, are incorporated by reference in their entirety.

Those skilled in the art will recognize that this invention may be embodied in other species than illustrated without departing from the spirit and scope of the essentials of this invention. The foregoing discussion is therefore to be considered illustrative and not restrictive. The scope of the invention is only limited by the appended claims.

What is claimed is:

1. A process for at least reducing the levels of at least one furanocoumarin in a grapefruit juice, comprising, incubating the grapefruit juice with dead fungal hyphae for an amount of time sufficient to reduce the levels of the at least one furanocoumarin, wherein the dead fungal hyphae is selected from a group consisting of *Aspergillus niger*, *Morchella esculenta*, and *Saccharomyces cerevisiae*.

2. The process of claim 1 where taste and nutritional value of the grapefruit juice are not changed.

3. The process of claim 1 where the fungal hyphae have been heat-killed.

* * * * *